July 6, 1971     G. SCHNOCK ETAL     3,591,344
DEVICE FOR CONTINUOUS POLYCONDENSATION
Filed July 5, 1968
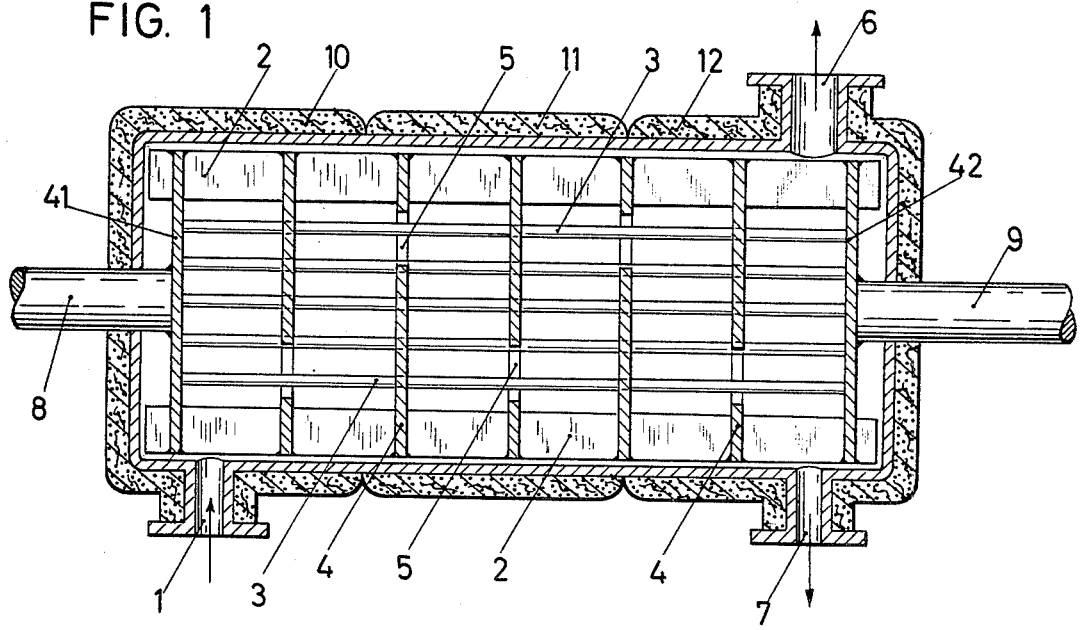
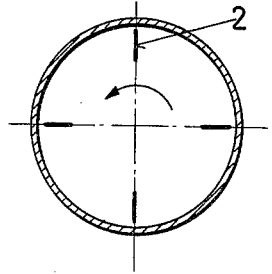
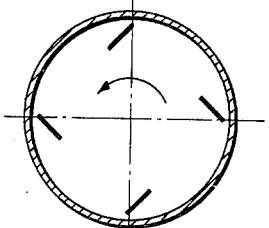
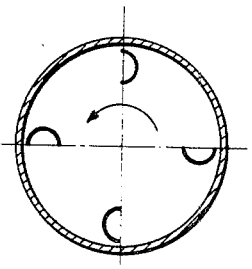
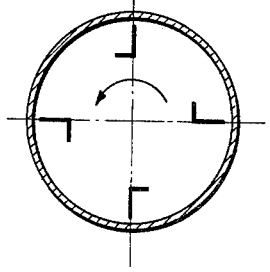
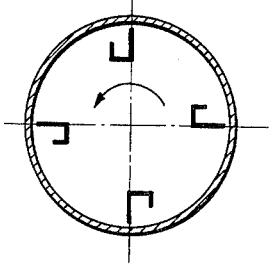
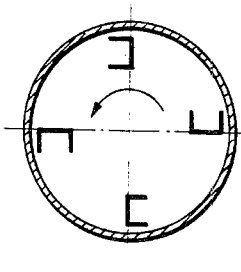
INVENTORS
GÜNTER SCHNOCK
PETER SCHWEIZER

INVENTORS
GÜNTER SCHNOCK
PETER SCHWEIZER

BY
ATTORNEYS

United States Patent Office 3,591,344
Patented July 6, 1971

3,591,344
DEVICE FOR CONTINUOUS POLYCONDENSATION
Günter Schnock, Bobingen, and Peter Schweizer, Konigsbrunn, Germany, assignors to Farbwerke Hoechst Aktiengesellschaft vormals Meister Lucius & Bruning, Frankfurt am Main, Germany
Filed July 5, 1968, Ser. No. 742,613
Claims priority, application Germany, July 26, 1967, F 53,068
Int. Cl. B01d 1/22
U.S. Cl. 23—285
7 Claims

ABSTRACT OF THE DISCLOSURE

The invention provides a device for the continuous polycondensation of melts comprising a heatable, vacuumtight, cylindrical or conical, horizontal or almost horizontal reactor with inlet at one end and outlet at the other end for the melt and outlet for the vapour and inside of the reactor a stirrer the shape of which is adapted to the shape of the reactor and the continuous or discontinuous axis of rotation of which is congruent with the axis of the reactor. The stirrer is subdivided by plurality of disks in vertical position with respect to its axis, which disks are provided with perforations staggered from disk to disk. Parallel to the axis of the stirrer a plurality of peripherally arranged groove- or ribbon-shaped drag elements are provided which are parallel to the axis of the stirrer and rod-shaped elements are fixed outside of the range of immersion of the stirrer into the melt, which elements preferably depart from the two outer disks. When the stirrer rotates the drag elements continuously convey the melt from the bottom of the reactor on to the rod-shaped elements inside of the stirrer where it is uniformly distributed in a thin layer and from where it returns into the sump of the reactor.

---

Figure 3A:
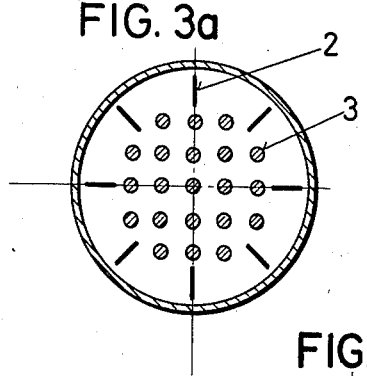
Figure 3B:
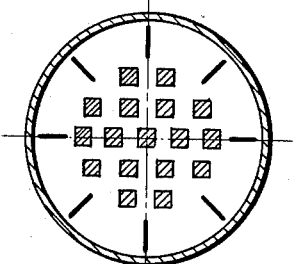
Figure 3C:
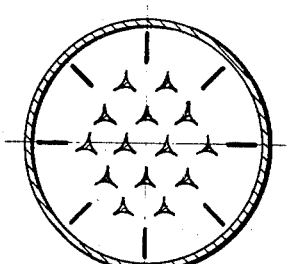
Figure 3D:
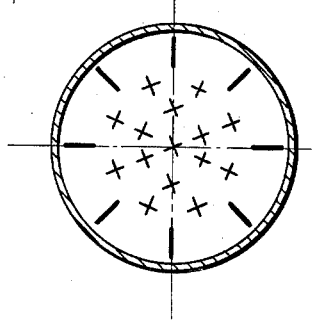
Figure 3E:
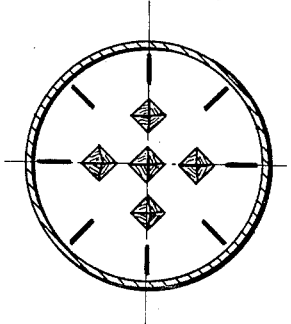

The present invention relates to a device for the continuous polycondensation of melts, the characteristic feature of the device being a stirrer having an especially favorable shape.

Various processes have been proposed to produce polyesters, especially polyethylene terephthalate. In many such processes bis-($\beta$-hydroxyethyl)-terephthalate is discontinuously polycondensed batchwise in containers. Such a process has serious drawbacks because the polyester melt cannot be transformed directly into shaped articles. It must be removed from the polycondensation vessel, cooled and granulated. After drying the granules are melted again and shaped articles are made therefrom in suitable devices.

In a continuous production of the polycondensation product the melt can directly be transformed into the desired structures. Expensive process steps need not be performed and nonuniformities in the polycondensation product owing to hydrolytic and thermal decomposition during drying and subsequent melting do not occur. The properties of polyethylene terephthalate largely depend on the reaction period required and the reaction conditions.

Besides the polycondensation reaction thermal decomposition takes place yielding coloured products and undesired by-products.

With given reaction conditions, such as temperature, type of catalyst and concentration thereof, the polycondensation rate largely depends on the speed with which the formed ethylene glycol is removed from the reaction equilibrium. It is, therefore, necessary to choose a large surface-to-volume-ratio of the melt and to operate under reduced pressure.

It has been proposed to carry out the polycondensation in thin layer evaporators of various constructions. In another process a large surface is produced by spinning the melt in a vacuum chamber. Falling film evaporators of different constructions as well as spraying of the melt in vacuum chambers or in an inert gas have been proposed not only for the final stage of a continuous polycondensation but also for the so-called "precondensation" of monomers or low viscous polycondensation products.

All these processes and devices have, however, serious disadvantages so that they are hardly suitable for industrial use. In falling film evaporators and other thin layer evaporators the surface of the melt is at most as large as the inner surface of the apparatus.

To reach the required reaction period it is either necessary to put through too low a quantity of material or the dimensions of the apparatus must be so large that the process can no longer be carried out in an economic manner. It is still more pregnant that commercial thin layer evaporators contain dead spaces of various dimensions, that is to say surfaces and turning elements where melt may deposit which is not constantly renewed. This amount of polyester undergoes further polycondensation, it decomposes and it again mixes with the normal melt which is thus contaminated and the quality of which is strongly reduced.

When the melt flows a long way in vertical direction products of very non uniform molecular weight are obtained. The melt viscosity of the polyester at equal temperature depends on the molecular weight. Small variations in the molecular weight of the low viscous melt introduced into the apparatus, which can never be fully avoided, yield low viscous polyethylene terephthalate of a more rapid flow which is intensely polycondensed for a shorter period of time than the product of higher viscosity. Hence, it follows that small variations in the molecular weight of the supplied product involve large variations of the molecular weight of the final product. In the case of falling film evaporators there also exists the danger that rivulets form and that the melt does not flow in a uniform layer over the whole surface of the evaporator. Preferred flowing zones can be observed, for example owing to the formation of deposits or non uniform viscosities.

When the melt is atomized, apart from the difficulties with the dead spaces and the prolonged period of time the melt remains on the walls, the quantitative separation of the fine droplets of the melt constitutes a problem difficult to solve. An incomplete separation of the fine droplets of the melt does not only lead to substance losses, but also involves obstructions in condensers, conduits and vacuum systems. It is, therefore, necessary to use more complicated separators than in the normal thin layer evaporators and in either case the product must be reconducted into the reactor. It is known that the product remains in the separator for a much longer time than in the reactor and that this time is of very different duration. Consequently, the product flowing back into the reactor contains polyester which is thermally decomposed and mostly damaged by oxidation and distinctly colored.

Still other devices have been proposed in which the melts are polycondensed under reduced pressure while heating and stirring, but the desired high viscosities and degrees of whiteness often cannot be obtained in sufficiently short periods of time.

The present invention provides a device for continuous polycondensation of melts which comprises a heatable, cylindrical or conical, horizontal or almost horizontal reactor provided with an inlet at one end and an outlet at the other end for the melt and a vapour outlet, which reactor contains a stirrer adapted to the shape of the reactor the continuous or discontinuous axis of rotation of which is congruent with the axis of the reactor. The stirrer is subdivided by a plurality of disks in vertical position with respect to its axis, which disks are provided with perforations staggered from disk to disk. Parallel to the axis of the stirrer a plurality of peripherally arranged, groove- or ribbon-shaped drag elements are provided for, parallel to which and parallel to the axis of the stirrer rod-shaped elements are fixed outside of the range of immersion of the stirrer into the melt, which elements preferably depart from the two outer disks. When the stirrer rotates the drag elements continuously convey the melt from the bottom of the reactor onto the rod-shaped elements inside of the stirrer where it is uniformly distributed in a thin layer and from where it returns into the melt-containing sump of the reactor.

It is advantageous to subdivide the heating of the reactor in individual sections with increasing temperature in the direction of reaction. It is likewise possible, however, to use a reactor with a single heating zone. Heating can be performed by electric means or by a liquid or gaseous heat transfer agent. The stirrer inside of the reactor should come as near as possible to the inner wall of the reactor. It is not necessary that the axis of the stirrer by which the stirrer is rotated by a drive outside of the reactor passes through both ends of the reactor casing. It is sufficient when it passes through that end of the reactor at which it is connected with the driving means. In the latter case the stirrer must be rotatably supported in the wall of the other end of the reactor. The drag elements and the rod-shaped elements between the two outer disks in vertical position to the axis of the stirrer then hold the stirrer together.

The disks arranged in vertical position with respect to the axis of the stirrer which subdivide the stirrer are advantageously provided with round, angular, semicircular perforations or perforations having the shape of a circular segment, which are staggered from disk to disk. The two outer disks need not have such perforations. The staggered perforations in the disks bring about a multiple change of direction of the vapours escaping from the melt and a separation of the droplets of the melt entrained by the vapours. Instead of the perforated disks serving to change the direction of the vapours there may also be used rings alternating with disks. In this case the outer diameter of the rings corresponds to the diameter of the stirrer, while the inner diameter of the rings approximately corresponds to that of the nonperforated disks. The perforations in the disks may have any other shape provided that they bring about a multiple deflection of the vapours and are large enough not to inhibit the flow of the melt.

At the periphery of the stirrer parallel to its axis a plurality of oblong groove- or ribbon-shaped drag elements are fixed which take along melt from the sump when the stirrer rotates. The drag elements are preferably provided with perforations.

The rod-shaped elements arranged in parallel position with respect to the drag elements and the axis of the stirrer are preferably rods of circular, angular, star-shaped or cross-shaped cross section or rods composed of octahedral structures. These rod-shaped elements may be perforated, too. The rod-shaped elements ensure as large a surface of the melt as possible. As rod-shaped elements there may also be installed structures having a different cross-section or composed of discreet bodies other than octahedrons provided that the aforesaid aim is attained. The elements should not immerse, however, into the melt.

The device according to the invention can be used to carry out any condensation reaction in which volatile compounds formed during the reaction are to be removed. It proved especially advantageous in the polycondensation of bis-diol-dicarboxylic acid esters and the low molecular weight condensation products thereof to yield polyesters of high molecular weight.

The acid components of the bis-diol-dicarboxylic acid esters are preferably acids such as terephthalic acid, isophthalic acid, 4,4'-diphenyl-dicarboxylic acid, hexahydro-terephthalic acid, adipic acid, sebacic acid, 1,3- 1,4- and 1,5-naphthalene-dicarboxylic acids, 2,5-dimethylterephthalic acid, 5-sulfo-isophthalic acid and bis-p-carboxyphenoxyethane. Suitable diol components are especially aliphatic diols such as ethylene glycol and butane-diol, cycloaliphatic diols such as cyclobutane-diol-1,2 and -1,3 and 1,4-dimethylolcyclohexane, as well as aromatic diols, for example p-xylylene-glycol. Especially good results are obtained when the device according to the invention is used for the manufacture of polyethylene terephthalate by polycondensation of bis-($\beta$-hydroxyethyl)-terephthalate or low molecular weight polycondensation products thereof. The starting materials may contain known and usual polycondensation catalysts and further additives, for example stabilizers or delustering agents.

In order rapidly to remove the formed glycol a low partial glycol pressure is maintained in the reaction zone by a vacuum or with an inert gas. The residence time of the melt in the reactor according to the invention depends on the viscosity of the starting product used and the desired molecular weight of the final product, residence times of from 10 minutes to 5 hours being preferred. The melt is then continuously conveyed from the reactor into a further polycondensation stage or it is worked up into shaped structures such as filaments, fibers, foils, chips or scales.

In the device of the invention the melt is distributed on a large surface for inside of the reactor a high proportion of the melt is always in the form of thin films whereby as large a surface-to-melt-volume ratio as possible is obtained. Care must be taken that the stirring speed is not so high that a ring of liquid circulating on the inner wall of the reactor is formed. In the latter case the effect of a rapid and thorough renewal of the surface and the intimate mixing of the melt would be lost.

In spite of the small dimensions of the short polycondensation periods can be chosen. As compared with known devices of similar construction, in the device according to the invention products of higher viscosity are produced in a shorter period of time. The residence time is not dependent on the dimensions of the reactor as in most thin layer evaporators; it may be varied as desired. Owing to the fact that no dead spaces are formed, the polyesters obtained have a high degree of whiteness and a low content of by-products.

The installed disks for the deflection of the vapours serve to separate, as already mentioned above, the droplets of the melt entrained by the strong evaporation of glycol, particularly when low molecular weight polyesters are used as starting material. It is, therefore, not necessary to separate in a subsequent stage the melt droplets and fog from the escaping vapours, whereby deficiencies such as colouration and increased content of thermally or oxidatively decomposed polyester in the final product are avoided. Moreover, the installed disks subdivide the reactor into chambers so that uniform residence time is ensured for all parts of the melt in the reactor and the condensation product obtained has a viscosity of high constancy.

The device according to the invention is especially suitable for the manufacture of polycondensation products of low to medium melt viscosity.

Figure 4A:
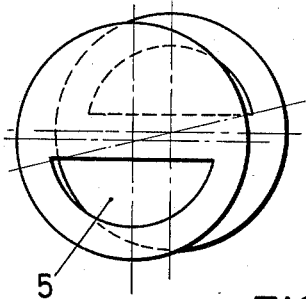
Figure 4B:
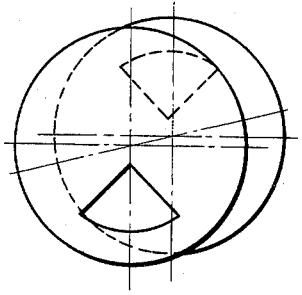
Figure 4C:
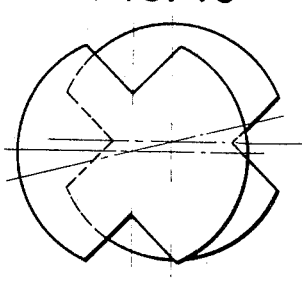
Figure 4D:
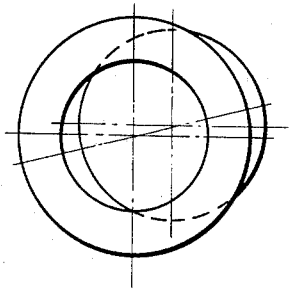
Figure 4E:
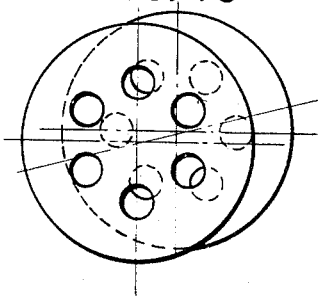

The invention is now illustrated with reference to the accompanying drawings in which:

FIG. 1 is a cross-sectional view of a cylindrical reactor. FIGS. 2a–f illustrate different types of drag elements. FIGS. 3a–e show different combinations of drag elements and rod-shaped elements. FIGS. 4a–e show different pairs of disks. The melt is introduced through inlet 1. By drag elements 2 of the stirrer the melt is distributed over the rod-shaped elements 3 in the stirrer and then returns into the sump of the reactor. Drag elements 2 and rod-shaped elements 3 are arranged in parallel position with respect to the discontinuous axis of the stirrer. Elements 2 and elements 3 are interconnected by disks 4 which bring about a separation of entrained droplets of the melt from the escaping vapours by means of staggered perforations 5. With the use of low molecular weight polyester as starting material the evaporation of glycol is very vigorous at the inlet side of the reactor. The glycol vapours are removed through conduit 6, the melt is discharged through outlet 7. The elements of the stirrer are connected with hubs 8 and 9 by disks 41 and 42. The reactor is heated by means of heating jacket 10, 11, and 12. FIG. 2 shows cross-sectional views of various shapes of drag elements 2. They may have the shape of blades (FIGS. 2a and b), of grooves (FIGS. 2c and d), or of boxes (FIGS. 2e and f). The drag elements may also have perforations. For the sake of clarity, the rod-shaped distributing elements are not shown in FIG. 2. The elements 3 intended to produce a large melt surface may consist of rods with circular cross section (FIG. 3A), angular cross section (FIG. 3b), star-shaped cross section (FIG. 3c), of metal strips in crosswise arrangement (FIG. 3d) or of discrete bodies (for example FIG. 3e) or of any other suitable shape, which are connected at the ends directly or with rods. In FIG. 3 only the shape of the drag elements shown in FIG. 2a is marked. FIG. 4 shows a selection of disks 4. The perspective drawings are top views showing the relative position of two disks of the same type arranged in the stirrer with the disks being adjacent each other, so that the alternating order of perforations 5 can be seen. These perforations may be of round, angular or semicircular shape or may have the shape of a circular segment. In one and the same stirrer the perforations in the disks may be of identical shape (FIGS. 4a, b, c, e) or they may be of different shape, as shown in FIG. 4d where angular disks alternate with disks of smaller outer diameter. Drag elements and rod-shaped elements are not shown in FIG. 4. The stirrer shown in the drawing is a so-called axleless type of stirrer. The stirrer may also have a continuous shaft.

The following examples serve to illustrate the invention but they are not intended to limit it thereto.

EXAMPLE 1

A reactor as shown in FIG. 1 having a length of 1.50 meters and an internal diameter of 0.40 meter was charged with a melt of bis-($\beta$-hydroxyethyl)-terephthalate in an amount of 60 kilograms per hour. The stirrer was subdivided by 9 disks having the shape shown in FIG. 4b. The drag elements had the shape illustrated in FIG. 2d.

Portions of the melt were continuously distributed by means of the stirrer over the cross-shaped elements (FIG. 3d) and returned into the sump of the reactor. The stirrer rotated 15 times per minute, the pressure in the reactor was 70 mm. of mercury, the melt had a temperature of 220° C. at the inlet and of 225° C. at the outlet. By regulating the level of the melt the residence time was adjusted to about 75 minutes. The polycondensation product discharged from the reactor had a specific solution viscosity $\eta_{spec}$ of 0.15.

The specific viscosity was determined with a 1% by weight solution of the polycondensation product in a mixture of 60 parts by weight of a phenol and 40 parts by weight of tetrachloroethane at 25° C. in a viscosimeter according to Ubbelohde.

EXAMPLE 2

In a reactor of the type shown in FIG. 1 in which the stirrer was subdivided by 9 separating disks a precondensation product of bis-($\beta$-hydroxyethyl)-terephthalate having a specific viscosity $\eta_{spec}$ of 0.13 (determined as defined in Example 1) was polycondensed. The reactor had a length of 1.50 meters and a diameter of 0.40 meter. The drag elements had a shape as shown in FIG. 2a, the rod-shaped elements had a shape as shown in FIG. 3a and the separating disks had shape 4a. The stirrer rotated at a speed of 15 revolutions per minute. The temperature of the melt was 270° C. and the pressure in the reactor amounted to 5 mm. of mercury. After a residence time of the melt in the reactor of 90 minutes the product had a specific viscosity $\eta_{spec}$ of 0.41.

What is claimed is:

1. An apparatus for continuously polycondensing melts consisting of a heatable, vacuum-tight, substantially horizontal reactor having a substantially circular cross-section with an inlet at one end and an outlet at the other end for the melt and with a vapor outlet, both the melt inlet and the melt outlet being at the base of the reactor and the vapor outlet being at the top of the reactor, a stirrer unit in the reactor, the stirrer unit comprising a rotatable shaft extending through one end of the reactor and defining an axis of rotation coaxial with the longitudinal axis of the reactor, a plurality of disks in the reactor disposed substantially perpendicular to the shaft, the outermost disk being connected to the shaft for rotation therewith, a plurality of drag elements and a plurality of rod-shaped elements interconnecting the disks whereby all of the disks and all of the drag elements and all of the rod-shaped elements rotate upon rotation of the shaft, the disks having perforations which are longitudinally staggered from disk to disk, the drag elements being longitudinally connected to the disks at the periphery of the disks, the drag elements being disposed adjacent to the inner wall of the reactor and conforming to the shape of the inner wall of the reactor, and the rod-shaped elements being longitudinally connected to the disks intermediate the periphery of the disks and the axis of rotation thereof whereby the rod-shaped elements are arranged outside of the immersion range of the melt so that during rotation the drag elements continuously convey melt from the bottom of the reactor onto the rod-shaped elements where the melt is uniformly distributed in a thin layer and from where it returns into the sump of the reactor.

2. The device of claim 1, wherein the heating of the reactor is subdivided into individual sections the temperature of which increases in the direction of reaction.

3. The device of claim 1, wherein the disks are provided with curved perforations.

4. The device of claim 1, wherein the disks consist of alternating rings and disks.

5. The device of claim 1, wherein the drag elements are arranged peripherally in parallel position with respect to the axis of the stirrer are provided with perforations.

6. The device of claim 1, wherein the rod-shaped elements are arranged in parallel position with respect to the drag elements and to the axis of the stirrer.

7. The device of claim 6, wherein the heating of the reactor is subdivided into individual sections the temperature of which increases in the direction of reaction, the disks being provided with curved perforations, the disks consisting of alternating rings and disks, and the drag elements being arranged peripherally in parallel position with respect to the axis of the stirrer are provided with perforations.

References Cited

UNITED STATES PATENTS

| 2,869,838 | 1/1959 | Ryder | 259—9 |
| 3,248,180 | 4/1966 | Kilpatrick | 23—285 |
| 3,337,508 | 8/1967 | Bachmann et al. | 23—285X |
| 3,440,019 | 4/1969 | Albrecht et al. | 23—285 |

FOREIGN PATENTS

| 1,034,449 | 6/1966 | Great Britain | 259—9 |

JAMES H. TAYMAN, JR., Primary Examiner

U.S. Cl. X.R.

259—9; 23—1, 252; 260—75; 159—6, 25